United States Patent
Yates

[11] Patent Number: 6,139,097
[45] Date of Patent: Oct. 31, 2000

[54] NO SLIP BICYCLE SEAT

[76] Inventor: Paul M. Yates, 5814 Briar Tree Dr., LaCanada, Calif. 91011

[21] Appl. No.: 08/865,083

[22] Filed: May 29, 1997

Related U.S. Application Data

[63] Continuation-in-part of application No. 08/733,001, Oct. 16, 1996, abandoned.

[51] Int. Cl.⁷ ..................................................... B60N 2/38
[52] U.S. Cl. ................................. 297/195.1; 297/215.16
[58] Field of Search ................................. 297/195.1, 214, 297/215.16; 29/527.1, 527.2; 264/132, 129, 135, 273

[56] References Cited

U.S. PATENT DOCUMENTS

| | | | |
|---|---|---|---|
| 714,245 | 11/1902 | Schürmann | 297/214 |
| 3,131,969 | 5/1964 | Kalter | 297/214 |
| 3,526,694 | 9/1970 | Lemelson | 264/135 X |
| 3,586,369 | 6/1971 | Worley | 297/195 |
| 3,756,653 | 9/1973 | Worley | 297/195 |
| 4,319,781 | 3/1982 | Tsuge | 297/214 |
| 4,366,981 | 1/1983 | Ziegler et al. | 297/215.16 |
| 4,395,817 | 8/1983 | Asada et al. | 264/135 X |
| 4,810,559 | 3/1989 | Fortier et al. | 428/161 |
| 4,850,643 | 7/1989 | Rollman | 297/214 |
| 5,397,162 | 3/1995 | Huang | 297/195.1 |

FOREIGN PATENT DOCUMENTS

| | | |
|---|---|---|
| 633897 | 5/1927 | France . |
| 655702 | 1/1938 | Germany . |

*Primary Examiner*—P. W. Echols
*Attorney, Agent, or Firm*—Walter A. Hackler

[57] ABSTRACT

A method of manufacturing a no slip bicycle saddle, or the like includes the steps of providing a bicycle seat shell, cutting a fabric to a size and shape suitable for covering the bicycle seat shell and forming a pressure plate having concavities on one side thereof disposed in a selected pattern, the selected pattern corresponding to a desired pattern of plastic material to be applied to the fabric. Fluid communication between each concavity and a supply of fluid plastic material. The cut fabric is then disposed on a bed and the pressure plate is forced against the cut fabric and bed to form a seal between the concavities. Fluid plastic material is then forced through the concavities and into the cut fabric disposed under each concavity to form the desired pattern on the cut fabric. Thereafter, the fluid plastic material is allowed to solidify and adhere to the fabric, and the pressure plate is separated from the cut fabric leaving a friction surface on the fabric. The fabric having a friction surface is stretched over the bicycle seat shell and a perimeter of the stretched fabric is secured to the bicycle seat shell.

1 Claim, 2 Drawing Sheets

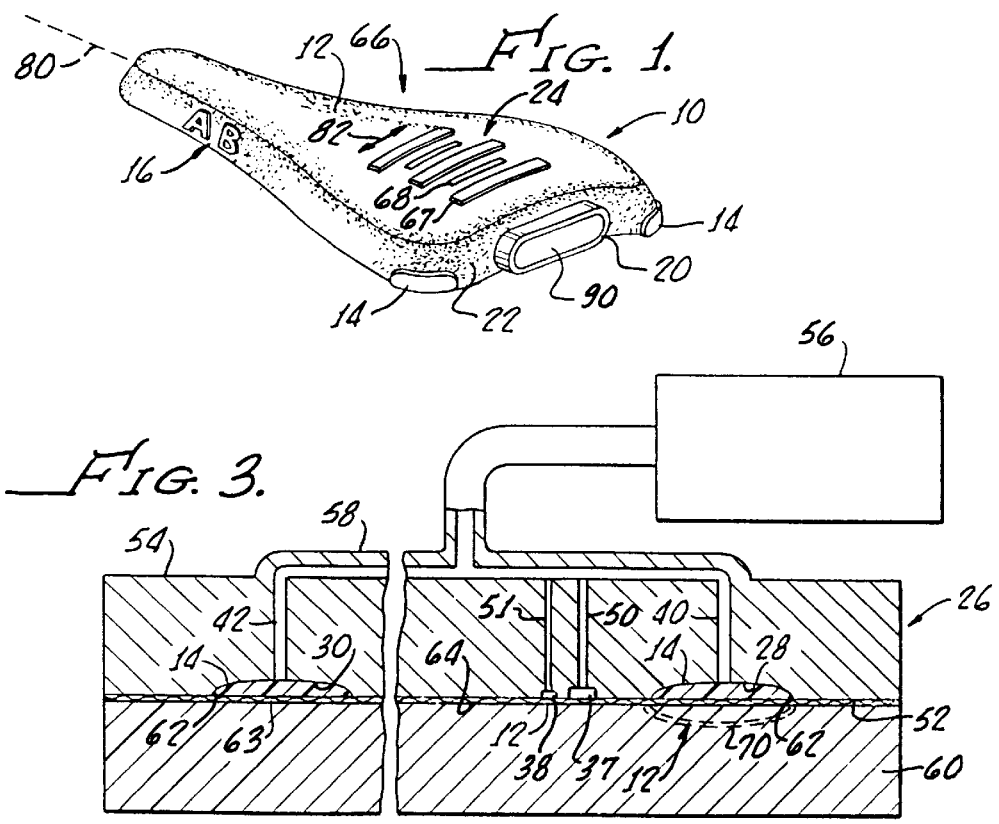
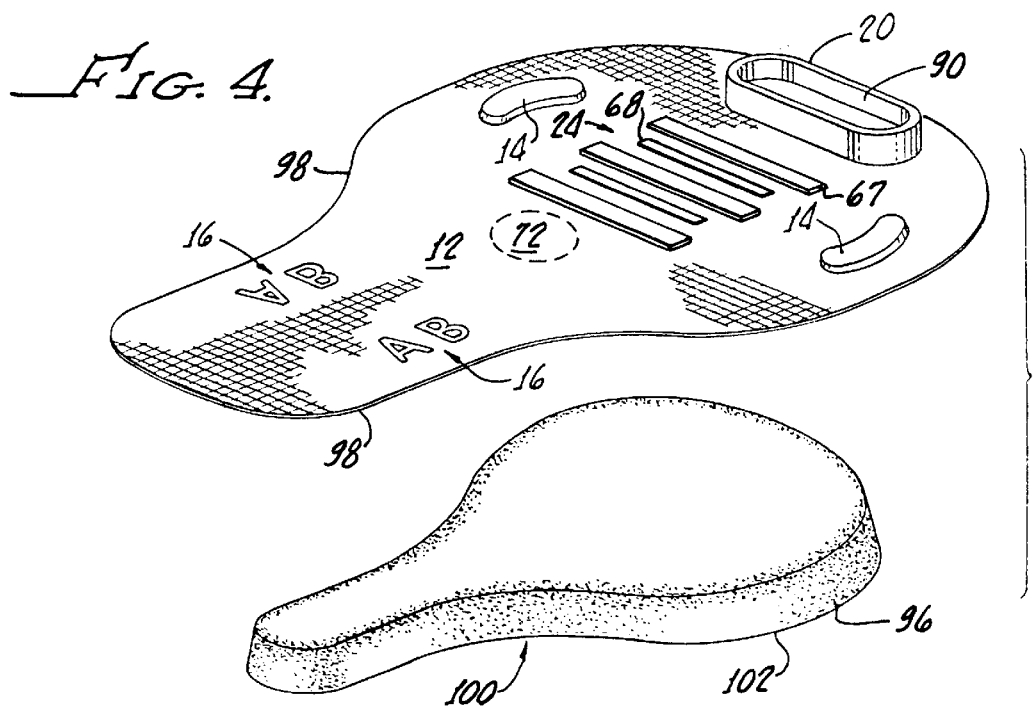

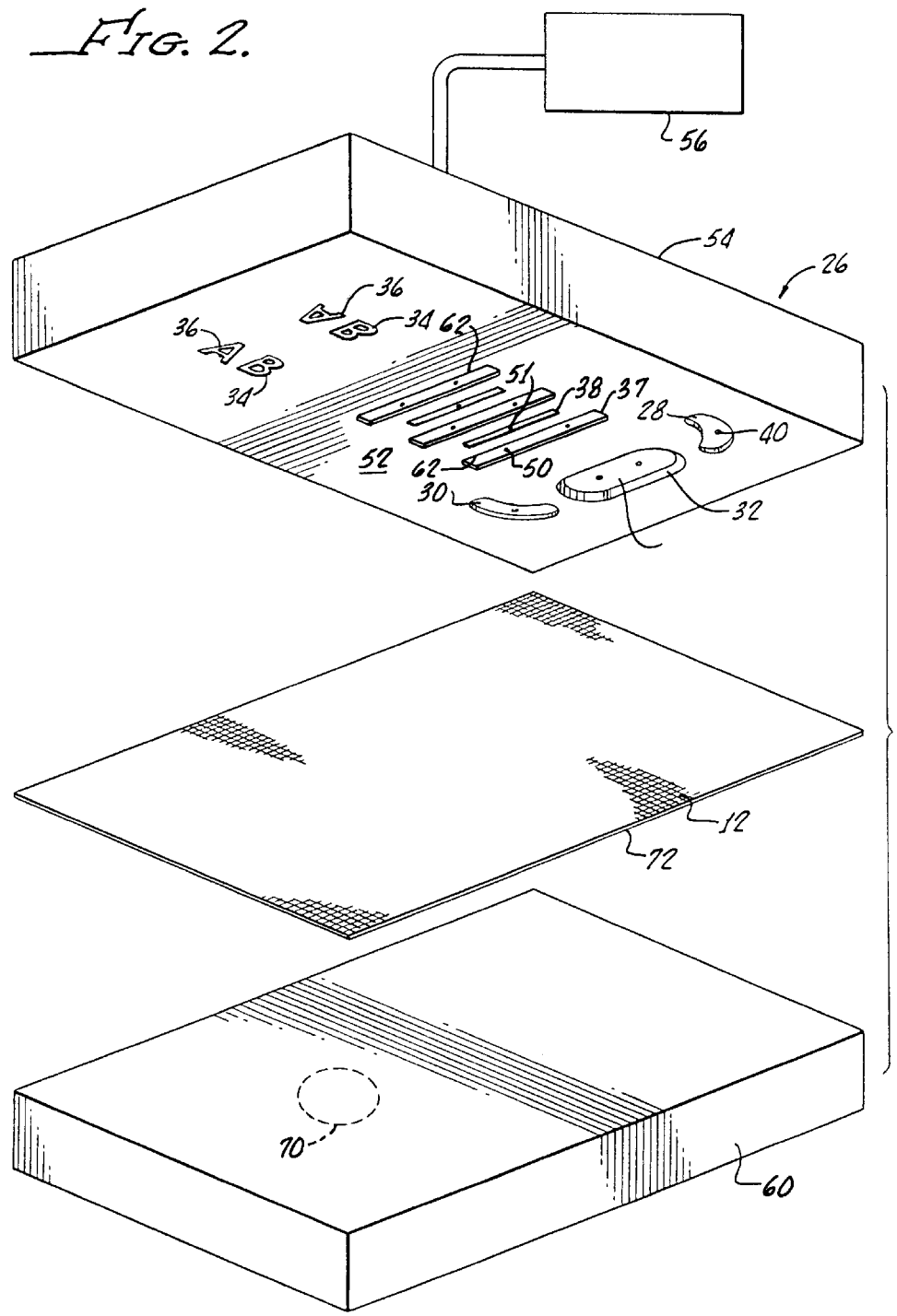

NO SLIP BICYCLE SEAT

This is a continuation in part of U.S. patent application Ser. No. 08/733,001 filed on Oct. 16, 1996 now abandoned.

The present invention generally relates to seats, or saddles, for bicycles and is more particularly directed to a bicycle saddle having a slip resistant covering and a method for manufacturing same.

Most modern high performance saddles consist of pliable or semi rigid molded shell over which a conforming padding material is disposed with a leather, plastic or vinyl cover fitted thereover. The use of these materials in modern saddles has resulted in a lighter, more durable and more appealing saddle than those earlier designed.

Modern design of bicycle seat covers includes a variety of decorative elements, company logos, multiple color application as well as protective elements. An example of such protective elements include scuff guards, or bumpers applied to portions of the perimeter of the covered shell to protect underlying fabric if the seat comes into contact with abrasive surfaces such as the side of a building against which the bicycle supporting the bicycle seat may be disposed or the ground in the event of intentional or accidental laying of the bicycle thereon.

Decorative design on the bicycle saddle may also serve a protective function by reducing the possibility of a rider slipping from the bicycle during riding thereof. For example, a substantial area of the bicycle seat may be sewn with decorative embroidery. Such embroidery has been found to be beneficial in reducing slip when compared to bicycle saddles having no embroidery thereon.

Unfortunately, when all of these desirable elements, hereinabove noted, are incorporated into a bicycle seat the manufacturing process requires a multitude of separate steps which include sewing of different colored fabric panels together, the sewing or adhesion of logos or protective elements to underlying fabric in addition to the conventional stretching of the cover over the shell. Needless to say, the added manufacturing steps results in a higher cost of manufacture.

In addition, the slip protection afforded by decorative embroidery, though offering some benefit, may not provide significant protection in many circumstances. For example, slip protection is particularly critical in circumstances where the bicycle seat becomes damp and the cyclist weary, and in such cases, embroidery may be less than adequate.

Friction between the cyclist and the saddle is particularly important for serious cyclists in terms of maximizing power, stability and control. For example, when beginning a race or beginning travel along an incline, a cyclist will often assume a standing position, and leave the seat of the bicycle in order to realize full power from each pedal stroke. Power and control may be lost if the cyclist is not secure in position upon returning to the seat. For competitive cyclists, nearly every movement by the cyclist is important, and consequently any unintentional movement, such as slipping along the seat, may significantly detract from the quality of the ride.

In addition, there is a need for a bicycle saddle which resists cyclist slipping in certain directions without compromising freedom of movement in other directions. For example, many cyclists encounter discomfort and fatigue associated with undesirable sliding on the saddle in a front to back direction, but prefer, and often require, a degree of freedom of motion in a side-to-side direction, particularly during turning maneuvers. The present invention provides a saddle which meets this need.

The present invention provides a bicycle saddle having a gripping seat surface which may be economically manufactured using any one of a variety of substances which provide substantial slip protection to a cyclist.

SUMMARY OF THE INVENTION

A method of manufacturing a bicycle saddle shell, or the like, generally includes the steps of providing a bicycle seat shell and a fabric for covering the shell.

In addition, a pressure plate is formed having concavities on one side thereof which are disposed in a selected pattern. The selected pattern corresponds to a desired pattern plastic material to be applied to the fabric. Fluid communication between each concavity is provided on another side of the pressure plate for connection to a supply of fluid plastic material.

The fabric is disposed on a bed and the pressure plate forced against the fabric and the bed to form a seal between the concavities. Thereafter fluid plastic material is forced through the concavities and onto portions of the fabric that are disposed under each concavity. This step forms the desired pattern on the fabric. After the fluid plastic has been allowed to adhere to the fabric and solidify, the pressure plate is separated from the fabric leaving solidified plastic embedded in the selected pattern on the fabric. The fabric may then be cut to a size and shape suitable for covering the bicycle seat form. Alternatively the fabric may be cut prior to application of the fluid plastic thereto.

The cut and fitted fabric is then stretched over the bicycle seat shell and a perimeter of the stretched fabric is secured to an underside of the bicycle seat shell.

More particularly, the concavities may be formed in the pressure plate in a pattern proximate the perimeter of the cut fabric and utilizing a plastic material which hardens to a flexible state the fabric may be stretched over the shell with the flexible plastic aligned along an edge of the bicycle seat to form a barrier for abrasion of the cut fabric stretched over the shell edge.

Still more particularly, the concavities may be formed in the pressure plate in a pattern for providing a legible script of hardened plastic on the cut fabric. In this manner a company logo, design or the like may be legible on the covered saddle shell.

Further, at least one of the concavities may be formed in the pressure plate with sufficient depth to provide hardened plastic of sufficient thickness on the cut fabric to enable fastening thereto by a screw or the like. This feature enables additional accessories such as, for example, a light or a license to be directly mounted to the finished bicycle seat.

Alternatively, at least one of the concavities may be formed in the pressure plate with a mold therein to provide the hardened plastic with a cavity to enable the insertion of a light emitting device therein. This simplifies assembly and provides for an integral mount for a replaceable light to be disposed on the bicycle seat, preferably in a rearward portion for the obvious purpose of signaling other drivers on a road or highway of the presence of a person utilizing a bicycle seat covered in accordance with the method of the present invention.

Preferably, the desired pattern of plastic material may form a friction surface on the fabric. In this embodiment, the plastic is adhered to the fabric at a position which corresponds to a seat portion of the saddle, for example, at approximately a center of the fabric.

The concavities may be formed with-varying depth in said pressure plate to provide an irregular, erose surface contour of solidified plastic on said cut fabric.

Advantageously, the bicycle saddle in accordance with the present invention may provide means for enhancing friction in a preferred direction. For example, the preferred direction of enhanced friction may be longitudinal along a longitudinal axis of the bicycle saddle. Enhanced friction in the longitudinal direction thus functions to reduce front to back slipping motion of a cyclist without compromising freedom of movement in a side to side, i.e. crosswise, direction. The means for enhancing friction, for example in the front to back direction, may include a ridged pattern of said plastic material, with ridges disposed crosswise, with respect to the bicycle saddle longitudinal axis.

The plastic material may be a thermal plastic material enabling a fluid state by heating thereof and accordingly, the step of allowing the fluid plastic to harden or solidify on the fabric includes allowing the fluid plastic to cool after it has been deposited on the fabric.

BRIEF DESCRIPTION OF THE DRAWINGS

The advantages and features of the present invention will be better understood by the following description when considered in conjunction with the accompanying drawings in which:

FIG. 1 is perspective view of a no slip bicycle saddle manufactured in accordance with the present invention, having a friction surface for reducing cyclist slip in a front to back direction;

FIG. 2 is an exploded perspective view of a pressure plate and bed suitable for use in the method of the present invention;

FIG. 3 is a cross sectional view of the pressure plate, fabric and bed when disposed for adhering plastic material onto the fabric, said pressure plate formed with concavities of varying depth for providing a friction surface with irregular contour; and FIG. 4 is an exploded perspective view of the bicycle saddle of the present invention showing the placement of the fabric, having a friction surface, onto a saddle shell.

DETAILED DESCRIPTION

Turning now to FIG. 1, there is shown a finished saddle 10 having a fabric 12, or fabric like material, disposed thereon with protective bumpers 14, a logo 16 formed in the fabric in legible script as well as a fixture 20 embedded in the fabric 12 and disposed in a rear portion 22 of the saddle 10 which is suitable for the insertion of an accessory, for example, a light emitting device, not shown. Also shown in FIG. 1 is a friction surface 24 on the fabric 12, which will be described in greater detail hereinafter.

In FIG. 2 there is shown a pressure plate 26 formed in accordance with the method of the present invention which includes a number of concavities 28, 30, 32, 34, 36, 37, 38 therein which are disposed in a selected pattern. The selected pattern corresponds to a desired pattern of plastic material to the fabric 12. It should be appreciated that the pressure plate 26 may be formed from any suitable material, such as metal or the like, and the concavities formed therein in a conventional manner.

Turning now as well to FIG. 3, feed apertures 40, 42, 50, 51 provide fluid communication from one side 52 of the pressure plate 26 to an opposite side 54 and are connected to a supply 56 of fluid plastic through interconnected channels 58, or the like disposed on the opposite side 54 of the pressure plate 26. In this manner fluid plastic material, such as, for example, heated thermoplastic material, may be forced from the supply 56 into each of the concavities 28, 30, 32, 34, 36, 37, 38.

In accordance with the present invention, the pressure plate 26 is forced against a suitable bed or flat surface 60 with fabric 12 therebetween as shown in FIG. 3. The bed 60 may be of any suitable rigid material for enabling the pressure plate 26 to press the fabric between the one side 52 of the pressure plate 26 and the bed 60 in order to form a seal between the concavities 28, 30, 32, 34, 36, 37, 38 to prevent unwanted disposition of plastic material on the fabric. In other words, when the fabric 12 is pressed between the pressure plate 26 and the bed 60, a seal is established at a perimeter 62 of each concavity at its line of contact with the fabric 12. The seal therefor functions to prevent fluid plastic material from seeping onto fabric outside these concavity perimeters 62. This provides a clean, neat appearance to the finished product 10.

It should be appreciated that although several concavities are shown, the pressure plate 26 may be formed with only a single concavity if so desired.

After the seal is established, fluid plastic is forced into the concavities 28, 30, 32, 34, 36, 37, 38 by way of the interconnected channels, or connectors 58, from the supply 56 and the plastic is embedded into the fabric 12. It should be appreciated that when the fabric is stretchable, for example, Lycra® or Kevlar® the plastic may be embedded directly into the nap of the fabric.

If a smooth fabric such as a vinyl or leather is utilized, small pinholes 63 may be provided in the fabric under at least one concavity 28 to enable the fluid plastic to flow through the fabric 12 to an opposite side 64 in order to fasten the plastic thereto. Also, if a plastic film is used instead of a cloth fabric, direct bonding to the film can be accomplished with the proper selection of materials.

It should be appreciated that any suitable hardening plastic material may be utilized for the fluid plastic material. For example, the fluid plastic material may be a thermoplastic material which bonds or adheres to the fabric upon cooling and solidifying.

Preferably, the desired pattern of plastic material may form the friction surface 24 on the fabric 12 for providing slip protection to a cyclist. In the embodiment shown, solidified plastic material is adhered to the fabric by being embedded or bonded thereto as described above, at a position which corresponds to a seat portion 66 of the saddle 10, for example, (see FIG. 1) at or adjacent approximately a center of the fabric, by the method described above. For forming the friction surface 24, the plastic material may be any suitable material selected for having a high coefficient of friction, for example, but not limited to, a thermoplastic elastomer.

In order to enhance friction of the friction surface 24, the concavities 37, 38 may be formed with varying depth in the pressure plate 26 to provide an irregular, erose surface contour of solidified plastic on the fabric covering 12 of the bicycle saddle 10. For example, the concavities 37, 38 may be of different depths as shown most clearly in FIG. 3. In the illustration, concavity 37 is deeper than concavity 38, thus forming plastic members 67, 68 (see FIG. 1) having different degrees of thickness.

In another embodiment of the present invention, a smooth, flush friction surface is formed in the fabric 12. In this embodiment, the pressure plate 26 may be provided without concavities. However, concavities 70 are formed in the bed 60, as shown by dashed line in FIGS. 2 and 3.

In this embodiment, the fabric 12 is disposed between the bed 60, having formed therein at least one concavity 70, and the pressure plate 26. When forced together, the bed 60 and pressure plate 26 form a seal therebetween, in other words, between the concavity 70 and the pressure plate 26. The fluid plastic material is forced through the pressure plate 26 and onto the fabric 12, particularly, a portion of the fabric 12 that is covering the bed concavity 70. The fluid plastic material is applied against the fabric 12 until the fabric 12 is forced into intimate contact with the concavity 70 and the fabric portion is filled with the fluid plastic material.

The fluid plastic material is allowed to adhere to the fabric 12 and solidify. When the fabric 12 is removed from between the pressure plate 26 and bed 60, solidified plastic 72 is flush with the surrounding fabric as shown by dashed line in FIG. 4. This is to be contrasted with the earlier described embodiment in which the solidified plastic material projects from the fabric 12. A bicycle saddle made in accordance with the flush surface embodiment will have a clean smooth appearance, yet will also provide the desired friction as well.

It should be appreciated that although the pressure plate 26 and bed 60 are shown as having flat, planar surfaces of contact, the pressure plate 26 and bed 60 may be formed with complementary curved surfaces of contact, if so desired.

Advantageously, the method for manufacturing the bicycle saddle 10 in accordance with the present invention may provide means for enhancing friction in a preferred direction. For example, the preferred direction of enhanced friction may be along a longitudinal axis (represented by dashed line 80 in FIG. 1) of the bicycle saddle 10. Enhanced friction in the longitudinal direction thus functions to reduce front to back slipping motion of a cyclist without compromising freedom of movement in a side to side, i.e. crosswise, direction (represented by double headed arrow 82 in FIG. 1).

This embodiment is particularly beneficial to a cyclist during turning maneuvers which require the cyclist to lean and slide along the saddle from side to side. In such instances, having enhanced friction between the cyclist and the saddle along the longitudinal axis, i.e. in the front to back direction, may help prevent fatigue, enhance stability and control, and provide greater harmony of movement between the cyclist and the bicycle.

As shown, the means for enhancing friction, for example in the front to back direction, may include a ridged pattern of said plastic material, with one or more ridged plastic members 67, 68 disposed crosswise, with respect to the bicycle saddle longitudinal axis 80.

Although a simplified display of a friction surface 24 is shown for the purpose of clearly illustrating the embodiment having ridges and an irregular surface for enhanced friction, it should be appreciated that any design may be used which incorporates these features. For example, the friction surface display may be a logo, lettering, pictorial display, or the like, having, if so desired, an irregular surface and/or ridges as described above. Furthermore, individual concavities may be formed with varying depth or selected textures.

After the fluid plastic is applied to the fabric in the manner discussed hereinabove, the fluid plastic material is allowed to adhere to the fabric 12 and solidify, creating the friction surface 24. The pressure plate is then separated from the friction surface 24 of the fabric 12, and the fabric is removed from the bed 60.

Preferably, the plastic members 67, 68 forming the friction surface 24 have a thickness suitable for providing sufficient friction. The thickness is, of course, dependent on the plastic utilized, however such thickness may be up to ⅛th of an inch or more depending upon maintaining a comfortable seating area, such thickness being measured from the surface of a plastic member to the fabric 12 to which it is adhered. Thus, the concavities 37, 38 may have a depth which corresponds accordingly.

The plastic may have a color different from that of the fabric 12, and if not used as a friction surface 24, may be applied only at a minimum thickness to prevent seeing the fabric color through the coated plastic. In this manner, various designs such as script pattern logos 16, may be disposed on the fabric 12 for decorative or informative purposes only. In this case, the concavities for the script pattern logo 16 may be formed to be very shallow, such that the applied plastic may be as thin as 0.05 inches.

Alternatively, concavity 32 may be formed in a pressure plate 26 with sufficient depth to provide hardened plastic 20 of sufficient thickness, for example up to about 0.5 inches, or more, to enable fastening to by a screw or the like. In addition, the concavity 32 may include a mold 88 to provide the hardened plastic 20 with a cavity 90 enabling the insertion of a light emitting device or the like (not shown).

It should be appreciated that the formed plastic 20 may be alternatively manually drilled to provide the cavity 90 for the insertion of a light device (not shown).

Turning to FIG. 4, the fabric 12 is cut to a desired shape corresponding to a shell 96 and stretched over the shell 96 in a conventional manner with a perimeter 98 of the fabric 12 may be secured to an underside 100 of the shell 96 in a conventional manner or otherwise attached to the shell 96.

As hereinabove noted, when suitable plastic material is utilized, the resulted hardened or solidified plastic is flexible and thus can be stretched around a perimeter 102 of the shell 96 to form the curved protective bumpers 14 as shown in FIG. 1. Thus, all of the protective ornamentation elements and in fact color pattern of the saddle 10 may be formed by the hereinabove described method in a single step and without additional steps of sewing and applying various elements to the fabric 12 during the manufacturing process.

Although there has been hereinabove described a method of covering a bicycle seat shell as well as a bicycle seat formed thereby in accordance with the present invention for the purpose of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the present invention as defined in the appended claims.

What is claimed is:

1. A no slip bicycle saddle comprising:

a bicycle saddle shell;

a fabric secured to said bicycle saddle shell; and means, including a pattern of plastic material adhered to said fabric, for providing friction in a direction along a longitudinal axis of the bicycle saddle in order to reduce front to back slipping of a cyclist, the pattern of plastic material including a plurality of plastic members having ridges disposed in crosswise direction with respect to said longitudinal axis.

* * * * *